United States Patent [19]

Miller

[11] Patent Number: 4,824,313

[45] Date of Patent: Apr. 25, 1989

[54] DEVICE FOR LIFTING AND MOVING CARPET ROLLS

[76] Inventor: Marvin Miller, P.O. Box 5637, Tahoe City, Calif. 95730

[21] Appl. No.: 125,879

[22] Filed: Nov. 27, 1987

[51] Int. Cl.⁴ .............................................. B62B 1/06
[52] U.S. Cl. ................................. 414/346; 280/47.24; 280/47.30; 414/444; 414/361; 414/911; 414/908; 242/86.5 R
[58] Field of Search ............... 414/444, 910, 911, 460, 414/446, 457, 908, 340, 343, 345, 346; 280/47.24, 47.30, 47.17, 47.37 R; 16/111 R, 112; 403/361; 242/86.5

[56] References Cited

U.S. PATENT DOCUMENTS

| | | | |
|---|---|---|---|
| 567,417 | 9/1896 | Sharples | 280/47.24 |
| 2,019,256 | 10/1935 | Dutton | 280/47.24 X |
| 2,208,196 | 7/1940 | Pitt | 403/361 X |
| 3,258,275 | 6/1966 | Schaefer et al. | 280/47.37 X |
| 3,485,520 | 12/1969 | Alexander | 403/361 X |
| 3,698,736 | 10/1972 | Shape | 414/444 X |
| 4,333,617 | 6/1982 | Hamilton | 280/47.24 X |
| 4,575,277 | 3/1986 | Dickey et al. | 403/361 |
| 4,705,283 | 11/1987 | Kleisath | 280/47.24 X |
| 4,711,407 | 12/1987 | Boon | 414/911 X |

FOREIGN PATENT DOCUMENTS

| | | | |
|---|---|---|---|
| 538165 | 7/1941 | United Kingdom | 280/47.24 |
| 731355 | 6/1955 | United Kingdom | 280/47.24 |

Primary Examiner—Frank E. Werner
Attorney, Agent, or Firm—Owen, Wickersham & Erickson

[57] ABSTRACT

An apparatus for lifting and moving heavy, elongated rolls of material comprises an elongated member adapted to be inserted axially in a roll of material, a pair of lifting devices for engaging end portions of the axial member that project from opposite ends of the roll. Each lifting device has a fulcrum member fixed to divergent members of a rigid frame structure. A holder for engaging one end portion of the axial member is fixed to one diverging frame member and an adjustable lever arm is attached to the other diverging frame member. A moveable dolly for supporting the roll of material after initial lifting has side projecting arms which can be engaged by the lifting devices so that when the dolly with a roll of material is lifted to a predetermined height the material can be moved axially on the dolly end onto another surface.

15 Claims, 5 Drawing Sheets

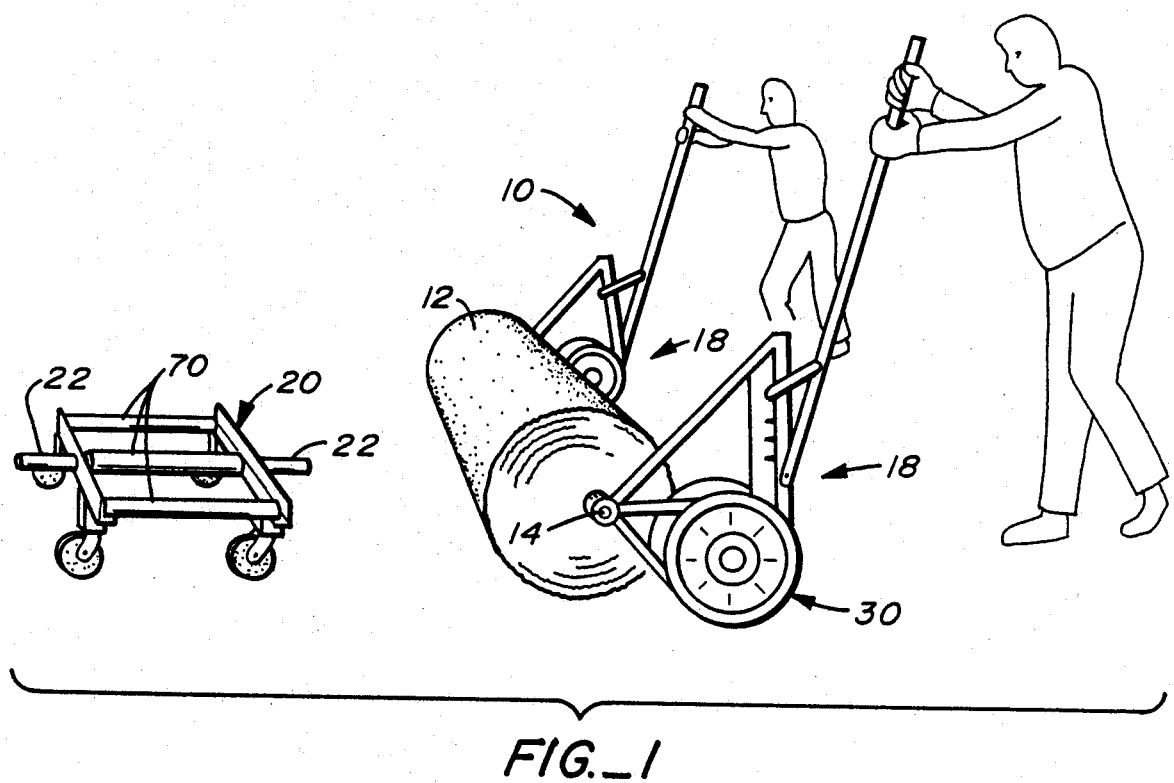
FIG._1

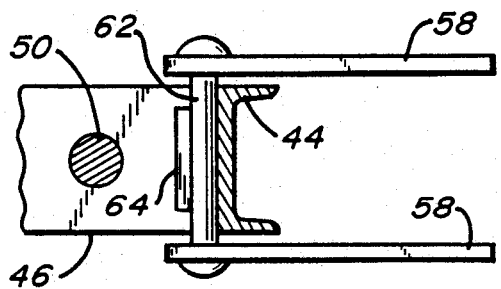
FIG._2A
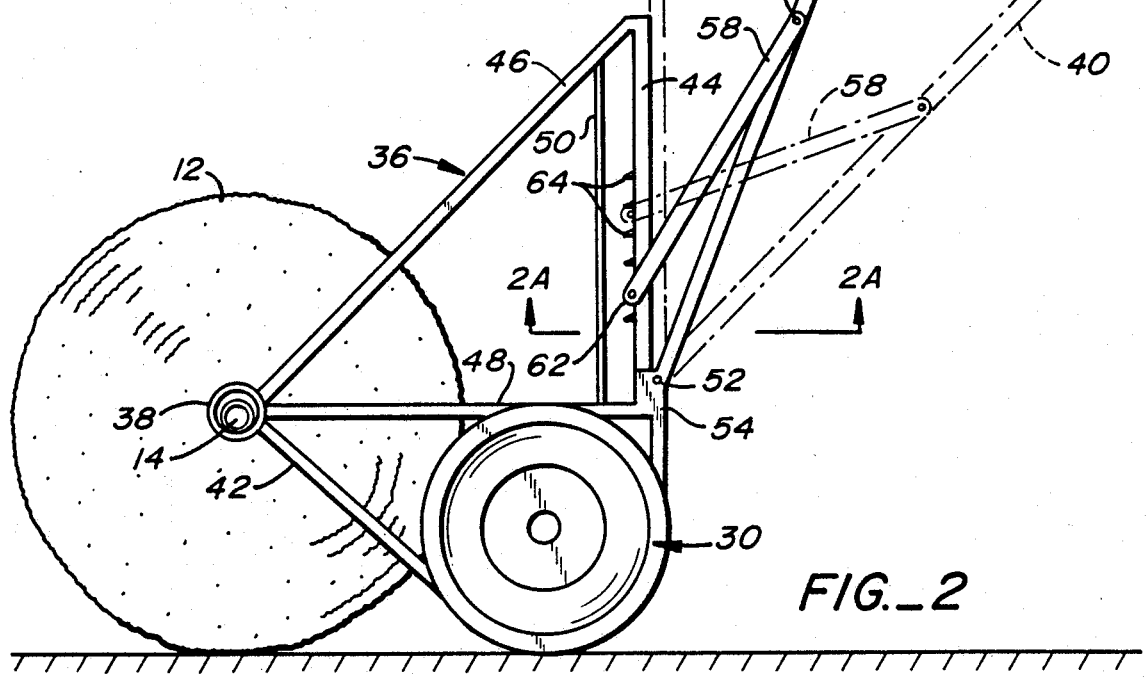
FIG._2

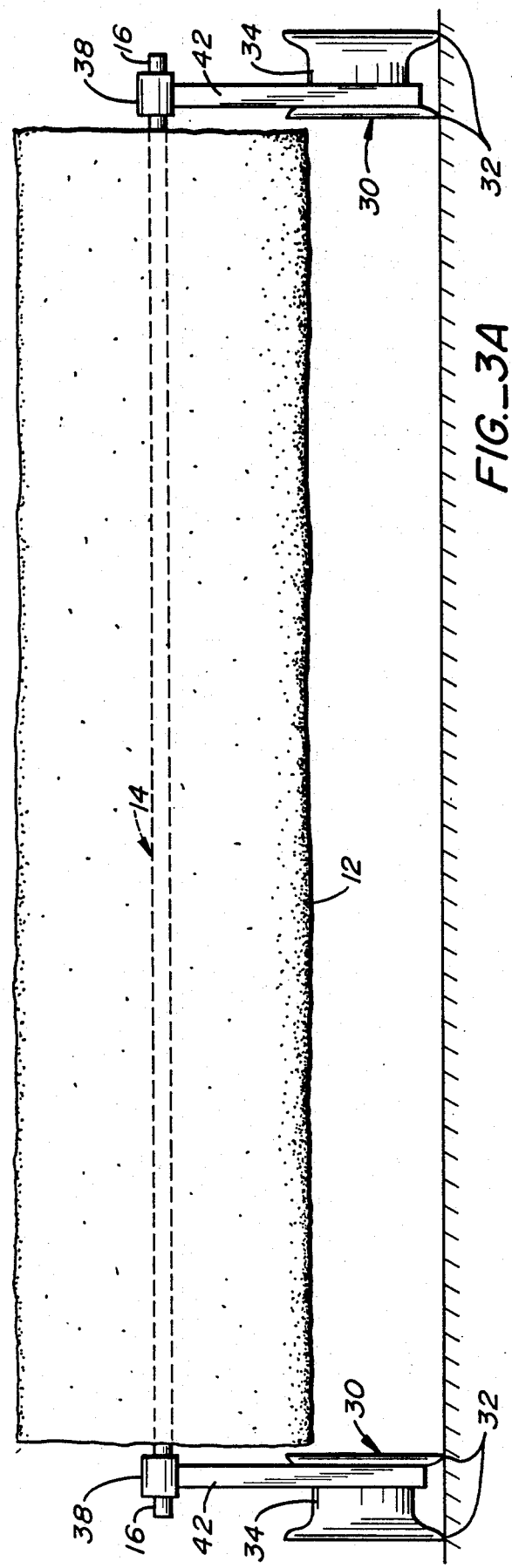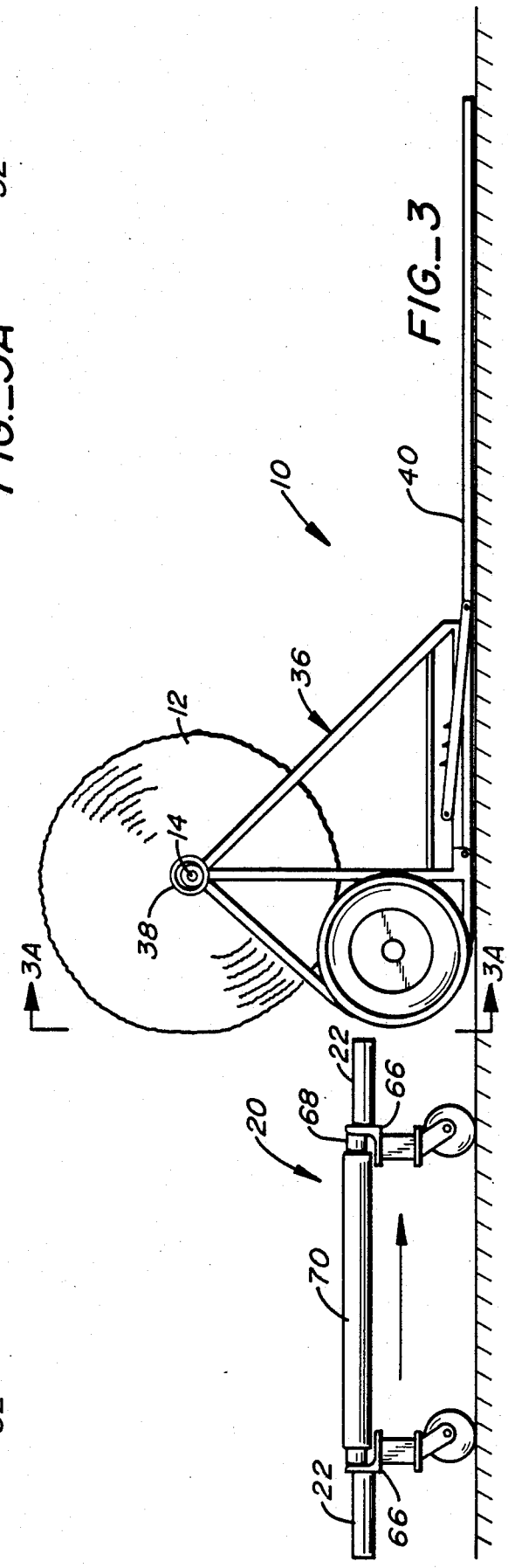

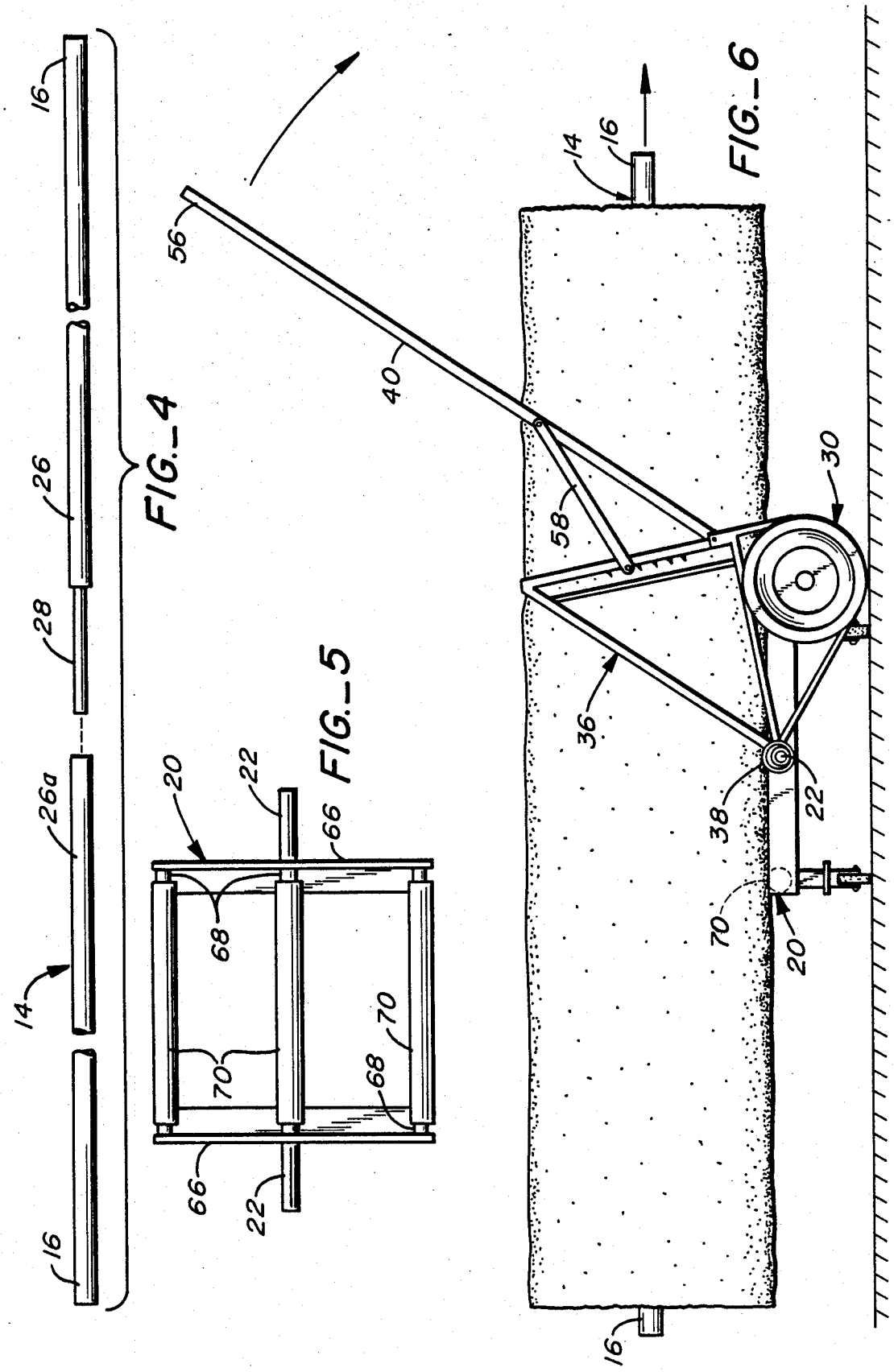

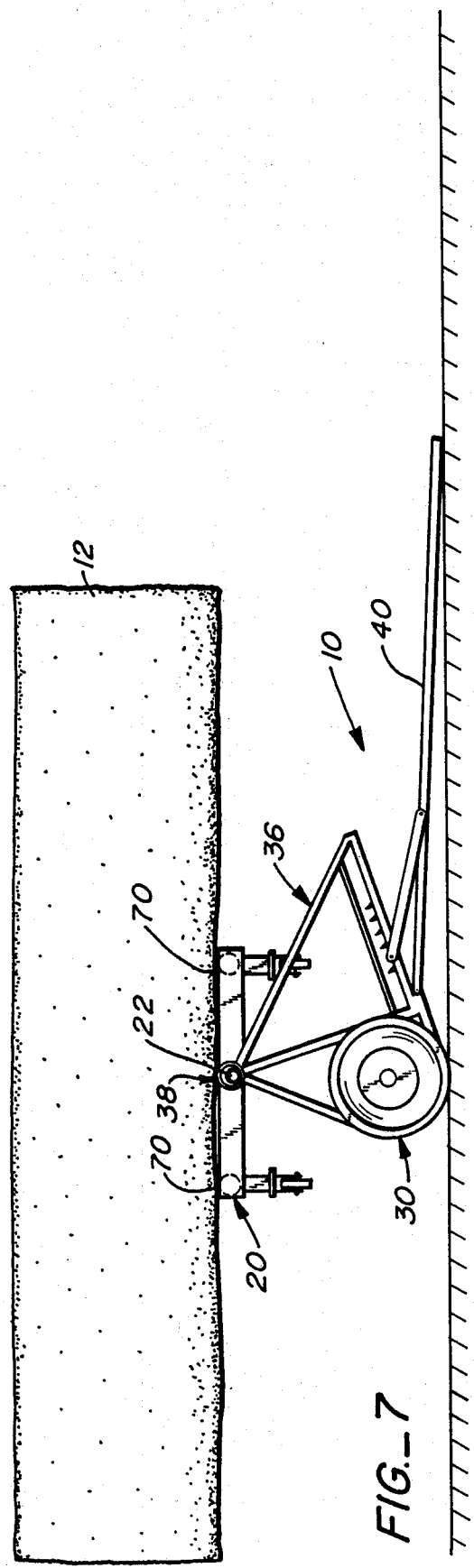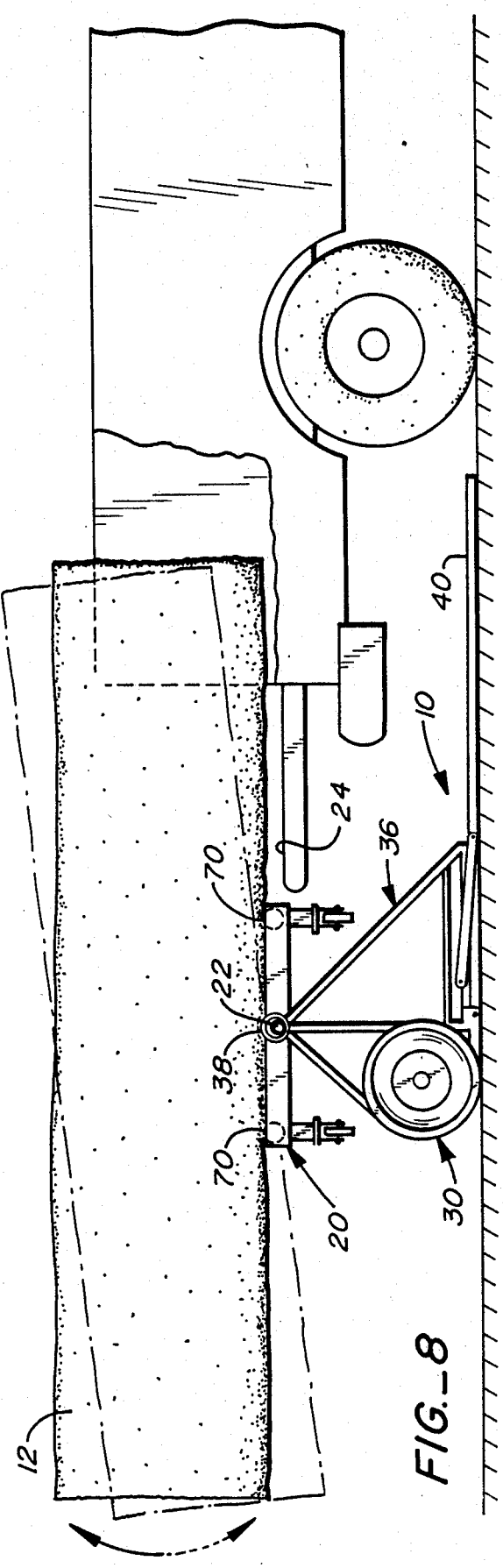
FIG._7
FIG._8

DEVICE FOR LIFTING AND MOVING CARPET ROLLS

This invention relates to apparatus for lifting and moving large, heavy inanimatee objects, and more particularly to apparatus for lifting and moving large, heavy rolls of material such as carpeting.

BACKGROUND OF THE INVENTION

In the carpet laying industry there has been a long felt need for an effective apparatus capable of easing the bodily stress of handling large, heavy rolls of carpeting at the job site. Generally, at such a job site, the carpet to be installed is brought in trucks in the form of long, single rolls of material which often weigh from 800 to 1500 lbs. For some relatively, large carpet laying jobs, motorized equipment such as standard fork lift trucks can be justified for handling the heavy rolls. However, for many smaller carpet laying jobs only one or two men with no motorized equipment are available at the job site and the required movement, lifting and handling of the large carpet rolls heretofore presented a serious problem, often resulting in severe fatigue and even injury to the carpet layers.

A general object of the present invention is to solve the aforesaid problem by providing an apparatus that facilitates the lifting and moving of heavy rolls of material without the assistance of motorized equipment.

Another object of the invention is to provide an apparatus operable by no more than two persons for lifting and moving heavy, elongated rolls of material in a relatively rapid manner without undue physical strain.

Another object of the invention is to provide an apparatus which can be maintained in a compact knockdown condition and then be quickly assembled for use with a minimum of time and without the need for special tools.

Another more specific object of the invention is to provide an apparatus for handling large, heavy rolls of carpet material wherein each roll is mounted on an elongated beam member through its axial center, and portions of the beam member which extend beyond the ends of the carpet roll are engaged by manually operated lifting devices that enable the roll to be raised from ground level.

A further object of the invention is to provide a handling apparatus for carpet rolls utilizing fulcrumed lifting devices with adjustable lever arms for altering the mechanical advantage to suit different handling situations.

A further object of the invention is to provide a handling apparatus for carpet rolls which includes a cradle assembly for supporting a carpet roll after it has been lifted so that it can be moved axially by a minimal manual effort.

SUMMARY OF THE INVENTION

In accordance with the principles of the invention, an apparatus for lifting and maneuvering heavy elongated rolls of materials such as carpeting is provided comprising a two-piece, elongated cylindrical bar, a pair of lifting devices for engaging opposite ends of the bar, an elongated cradle or dolly for temporarily supporting a heavy roll as it is lifted and having roller means to enable the roll to be moved axially and thus onto a truck bed, for example. Each lifting device has a rounded fulcrum means to which is attached a frame assembly comprised of a pair of diverging arms. The outer end of one arm on the frame assembly is provided with a retaining means for holding one end of the elongated cylindrical bar during one phase of a lifting operation and thereafter for similarly holding one end of a shorter bar on the dolly member during a second phase of a lifting operation. An adjustable lever arm on the lifting device enables a user to apply maximum leverage force while maintaining a normal, easily attainable bodily position. In use, two persons of ordinary strength can lift a roll of material such as a roll of carpet weighing up to 1500 lbs., and then with the dolly, move the roll onto another surface such as a truck bed.

Other objects, advantages and features of the invention will become readily apparent from the following detailed description of one embodiment thereof, presented in conjunction with the accompanying drawing.

BRIEF DESCRIPTION OF THE DRAWING

FIG. 1 is a view in perspective showing a carpet roll moving apparatus as it appears in use according to the invention.

FIG. 2 is a view in elevation showing a lifting device for the apparatus of FIG. 1, with an engaged carpet roll on the ground.

FIG. 2A is an enlarged view in section taken along line 2A—2A of FIG. 2.

FIG. 3 is a view in elevation similar to FIG. 2 showing the carpet roll lifted and ready for loading onto a dolly.

FIG. 3A is a view in elevation taken along the line 3A—3A of FIG. 3.

FIG. 4 is an exploded view of a jointed axle beam for the apparatus of FIG. 1.

FIG. 5 is a plan view of a dolly for the apparatus of FIG. 1.

FIG. 6 is a view in elevation showing a carpet roll supported on the dolly of FIG. 5, according to the present invention.

FIG. 7 is a view similar to FIG. 6 showing the dolly and carpet roll being raised by a pair of lifting devices according to the invention.

FIG. 8 is a view similar to FIG. 7 showing the raised carpet roll as it is moved axially on the dolly and onto a truck bed.

DETAILED DESCRIPTION OF THE EMBODIMENT

With reference to the drawing, FIG. 1 illustrate an apparatus 10 for lifting and then moving a heavy carpet roll 12 embodying principles of the present invention as it appears in use. In broad terms, the apparatus comprises an elongated axle beam 14 adapted to be inserted axially into the carpet roll so that end portions of the beam extend from opposite ends of the roll, a pair of identical manually operable lifting devices 18 adapted to engage and support the beam end portions, and a modified dolly 20 for temporarily cradling the carpet roll and having side projections 22. Once the carpet roll is situated on the dolly 20, the lifting devices 18 are used again to engage the dolly projections 22 to lift the carpet roll and dolly together to a height above ground that is sufficient to facilitate easy loading onto another surface such as a truck bed 24.

The axle beam 14, as shown in FIG. 4, may be made from two tubular sections 26 and 26(a), preferably of a light but strong metal, such as aluminum alloy. One section 26 is provided with a plug insert 28 that is fixed within but extends beyond its inner end so that the two sections can be readily joined together within the roll. When inserted axially from opposite ends of a carpet roll, the end portions 16 of the axle beam extend beyond the opposite ends of the carpet roll.

As shown in FIG. 2, each lifting device 18 is comprised of a circular fulcrum means 30 having a relatively large radius and adapted to rest on the ground surface. This fulcrum means may be made of any suitable annular structure of rigid material such as a short section of large metal pipe. However, in the embodiment shown, (See FIG. 3A) a metal vehicle wheel is utilized for the fulcrum means which has spaced apart outer rim portions 32 of the same diameter on the opposite ends of an intermediate annular portion 34 of a smaller diameter. The annular portion, for best results should have an outside diameter of 12 to 15 inches.

As shown in FIG. 2, a frame structure 36 is attached to the fulcrum means 30 for supporting a holder means 38 and also a handle or lever arm 40 for moving the lifting device. As also shown in FIG. 9, the frame structure comprises a first frame member 42 which is fixed at one end, as by welding, to the annular portion 34 of the fulcrum means 30. At its outer end, the frame member 42 is attached to the holder means 38 which, as shown, may be a short annular member (or a hemispherical member, if desired) having a diameter that is larger than the end portions of the axle beam 14. A second frame member 44 is also attached tangentially at its inner end to the annular portion of the fulcrum member 30 by suitable means such as welding. The outer end of this latter frame member 44 is connected to one end of a third or outer member 46 whose other end is also fixed to the holder means 38. A fourth frame member 48 is attached to the second frame member 44 and also to the fulcrum means 30 and then extends to the holder means to provide it with further support. An auxiliary frame or rod member 50 extends parallel to the second frame member 44 between the third and fourth frame members 46 and 48 to provide additional strength and to control the movement of a locking link 58, to be described below. All of the five members of frame structure 36 are essentially connected together and to the fulcrum member 30 as described, to provide a strong rigid structure.

Pivotally attached by a pin 52 to an enlarged journal portion 54 of the second frame member 44 is an elongated moveable lever arm 40 with an extended handle portion 56 that forms an adjustable arm for the lifting device. This lever arm is connected to the second frame member 44 by a moveable link 58 which is pivotally attached at one end by a pin 60 to the lever arm/handle member 56. At the other end of the moveable link 58 is a cylindrical dog member 62 which is retained by one of a series of cogs 64 fixed at spaced apart intervals to the inside surface of the second frame member 44. (See FIG. 2A) Thus, as shown in FIG. 2, the angular position of the lever arm/handle relative to the fixed frame member 44 may be altered by moving the end of the link 58 to the desired cog 64. Now, when force is applied near the outer end of the handle or lever arm 56, it is transmitted through the link 58 to the frame member 44 as a torsional force about the fulcrum member 30.

Turning to FIGS. 3 and 6, the dolly 20 may be used as part of the apparatus 10 whenever it becomes necessary to first lift the carpet roll 12 and then move it in an axial direction onto another surface. As shown in FIG. 5, the dolly has generally a rectangular shape and is comprised of a pair of parallel spaced apart side frame members 66 interconnected by transverse rod members 68. Each rod member is surrounded by a freely rotatable sleeve member 70. Extending outwardly from opposite sides of the two side frame members 66 near their midpoint are a pair of cylindrical members 70 which are preferably aligned with a central rod member. These cylindrical members form the handle-like projections 22 that can be engaged and retained by the holder means 38 on each lifting device 18.

The operation of the apparatus 10 for lifting and moving a heavy carpet roll 12 may be best understood by reference to FIGS. 2, 3 and 6-8. With the carpet roll initially on the ground surface, the two-piece axle beam 14 is first installed through the carpet roll core which is normally comprises a heavy paper or plastic tube. The axle sections 14 are installed from opposite ends of the roll and are coupled together within the roll by the central plug section 28. With axle sections 26 and 26(a) coupled together, their outer end portions 16 extend beyond each end of the carpet roll. Each end portion is now engaged by a holder means 38 of a lifting device 18 as shown in FIG. 2. In this position, with the fulcrum means 30 of each lifting device adjacent to one end of the roll, the second frame member 44 of each lifting device is substantially perpendicular to the ground surface. However, the lever arm/handle member 56 extends at roughly a thirty degree angle to the second frame member 44 by means of the adjustable link 58. If desired, the angle between the lever arm/handle member could be lessor or greater by further adjustment of the link end connection on the second frame member, so that it becomes easier for a person to apply a maximum force to the handle in the most effective manner. When this force is applied by the two lifting devices 18 simultaneously at opposite ends of the carpet roll 12, it is readily lifted off the ground, as shown in FIG. 3.

As the carpet roll is lifted from ground level due to force applied to the two handles 56, the roll rotates upwardly in an arcuate path about the fulcrum member 30, and ultimately the second frame member 44 and the lever arm/handle 56 both engage the ground surface. In this position, the carpet roll has moved to the opposite side of the fulcrum member 30 and is in a stable position above the second frame member.

In this above ground position, the carpet roll can now be rotated about the axle beam 14. Thus, on a job site, carpet layers can conveniently measure and cut off sections of carpet from the heavy roll as it is being used for an installation.

If the carpet roll in the upright position of FIG. 3 must be moved onto another surface that is higher than ground level, such as the bed of a truck, the dolly 20 is used. First, as indicated in FIG. 3, the dolly is moved on its wheels to a position to receive the carpet roll as the latter is again lowered toward the ground level by manual manipulation of the lifting devices 18. As the carpet roll 12 is lowered, it is positioned between and parallel to the side frame members 66 of the dolly so that it becomes supported by the transverse rollers 70.

Now, as shown in FIG. 6, the two lifting devices 18 are attached to opposite sides of the dolly 20 with the holder means of each lifting device engaged with a projecting member 72 on the dolly. Again the lever arm/handle 56 on each lifting device is adjusted to a position, by movement of the link 58, so that a person can conveniently grasp the lever arm/handle 56 and supply a lifting force to it.

As shown in FIG. 7, the carpet roll supported on the dolly 20 are both lifted to a maximum height as force is applied to the frame means from the lever arm/handle 56. As the handle nears the ground as the carpet roll is lifted, the link 58 can be changed in position until from one cog to another until the handle is essentially parallel with the second frame member 44. The auxillary frame member 50 prevents the end of the links 58 from moving too far away from the cogs 64 on the frame 44.

With the carpet roll and dolly in the fully raised and stable position, as shown in FIG. 8, the carpet roll can be moved axially on the dolly rollers 70 and onto the bed surface 24 of a truck 76, for example.

From the foregoing, it is apparent that the present invention enables two persons to lift and maneuver a large, heavy roll of material in a manner which otherwise would require motorized equipment. It thus alleviates a severe problem for persons such as carpet layers who heretofore suffered bodily injury or serious fatigue as well as a degradation of production efficiency on the job when required to move and lift heavy rolls.

To those skilled in the art to which this inveniton relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. An apparatus for lifting a heavy, elongated roll of material so as to maneuver it onto a surface above ground level, comprising:
    an elongated beam means adapted for insertion axially within said roll so that end portions of said beam means extend from each end of said roll;
    a pair of lifting means for engaging each said end portion of said roll, each said lifting means comprising a fulcrum means, a pair of first and second rigid members attached to and extending divergently from said fulcrum means, a holder means attached to the end of said first member for engaging one extending end portion of said beam means; a lever arm means having an extended length and attached to said second rigid member; whereby with said beam means inserted in said roll of material and with said holder means engaging said extending end portions of said beam means, force applied to said lever arm means will cause said holder means to move about said fulcrum means and thereby raise said roll of material from the ground; said apparatus further including in combination a generally rectangular platform means for supporting the roll of material after it has been lifted from the ground level; and extended transverse side members projecting outwardly from said platform and adapted to be engaged by said holder means of said lifting means.

2. The apparatus as described in claim 1 wherein said platform means comprises a pair of spaced apart frame members, a plurality of transverse members extending between and fixed to said frame members.

3. The apparatus as described in claim 2 wherein said transverse members are each surrounded by a rotatable outer sleeve thereby enabling the roll of material to be moved relative to the platform means as said outer sleeves rotate, after the roll of material has been lifted by said lifting means.

4. The apparatus as described in claim 3 including castor wheels attached to said platform means to enable it to be moved on a ground surface.

5. The apparatus as described in claim 1 wherein said lever means includes an adjustable lever arm having an extended handle portion and pivotally attached to said second member and linkage means for adjusting the angular position of said handle means relative to said second rigid member; whereby a force applied to the handle portion of said lever arm causes a lifting force on said holder means about said fulcrum means.

6. The apparatus as described in claim 5 wherein said linkage means comprises a rigid link member having one end pivotally attached to said lever arm, and, a retainer means on its other end, and a series of cog members fixed to and spaced apart on said second frame member, each cog member being adapted to cooperate with said retainer means on said link member to hold it firmly in a preselected angular position relative to said second member position when lifting force is applied to said handle means.

7. The apparatus as described in claim 1 wherein said fulcrum means comprises an annular body to which said first and second frame members are attached.

8. The apparatus as described in claim 7 wherein said annular body of said fulcrum means is at least 12 to 15 inches in diameter with integral outer rim portion having a greater diameter.

9. The apparatus as described in claim 1 wherein said beam means comprises two connectable sections of metal tubing, one said section having an extending plug means that fits in the other adjoining section when they are connected within a roll of material.

10. The apparatus as described in claim 1 wherein said holder means on said lifting means comprises an annular member somewhat larger than the diameter of the end portions of said beam means.

11. The apparatus are described in claim 1 wherein said first and second rigid members form two sides of a triangular frame means fixed to said fulcrum means and including a third rigid member interconnecting the ends of said first and second rigid members.

12. An apparatus for lifting and then moving axially a heavy, elongated roll of carpet material so as to maneuver it onto a surface above ground level, comprising
    an elongated tubular beam means adapted for insertion axially along the centerline of the carpet roll and having a length sufficient to provide end portions of said beam means that extend from each end of the roll;
    a pair of lifting means for engaging each said end portion of said roll, said lifting means including a fulcrum means, a holder means attached to and spaced from an end portion of said beam means, a lever arm means attached to and extending from the other side of said fulcrum means and having a handle portion; and
    a dolly means having side frame members interconnected by transverse members, and side members projecting outwardly from said side frame members and adapted to be retained by said holder means of said lifting means;
    whereby said lifting means are first used for lifting said carpet roll from the ground and placing it on said dolly means and are then used to retain said side member on said dolly means to a level where it can be moved axially on said dolly means and onto another surface that is above the ground level.

13. The apparatus as described in claim 12 wherein each said lifting means includes a rigid frame means for supporting said fulcrum means, said holder means and said lever arm means.

14. The apparatus as described in claim 12 wherein each said lifting means includes a linkage means for adjusting the position of said lever arm means relative to said fulcrum means to facilitate the efficient application of force to the lever arm means during the lifting operation.

15. The apparatus as described in claim 14 wherein said linkage means comprises a link member pivotally connected at one end to said lever arm means and having a retainer means at its other end for connecting said link member to said frame means at a preselected location.

* * * * *